US007805127B2

(12) United States Patent
Andreasen et al.

(10) Patent No.: US 7,805,127 B2
(45) Date of Patent: Sep. 28, 2010

(54) SYSTEM AND METHOD FOR GENERATING A UNIFIED ACCOUNTING RECORD FOR A COMMUNICATION SESSION

(75) Inventors: Flemming S. Andreasen, Marlboro, NJ (US); Jonathan D. Rosenberg, Freehold, NJ (US); Jayaraman R. Iyer, Sunnyvale, CA (US); Biswaranjan Panda, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 125 days.

(21) Appl. No.: 11/715,210

(22) Filed: Mar. 6, 2007

(65) Prior Publication Data

US 2007/0206515 A1    Sep. 6, 2007

Related U.S. Application Data

(60) Provisional application No. 60/780,176, filed on Mar. 6, 2006.

(51) Int. Cl.
*H04M 11/00*    (2006.01)

(52) U.S. Cl. ................ 455/408; 455/405; 455/406; 455/407

(58) Field of Classification Search .......... 455/405–408
See application file for complete search history.

(56) References Cited

U.S. PATENT DOCUMENTS

| 5,602,907 | A | 2/1997 | Hata et al. ................ 379/114 |
| 5,822,411 | A | 10/1998 | Swale et al. ............... 379/111 |
| 5,828,737 | A | 10/1998 | Sawyer ...................... 379/114 |
| 5,905,736 | A | 5/1999 | Ronen et al. ................ 370/546 |
| 5,909,238 | A | 6/1999 | Nagashima et al. ............ 348/3 |
| 5,946,670 | A | 8/1999 | Motohashi et al. .......... 705/400 |
| 5,956,391 | A | 9/1999 | Melen et al. ................ 379/114 |
| 5,970,477 | A | 10/1999 | Roden ......................... 705/32 |
| 5,987,498 | A | 11/1999 | Athing et al. ............... 709/203 |
| 6,016,509 | A | 1/2000 | Dedrick ...................... 709/224 |
| 6,035,281 | A | 3/2000 | Crosskey et al. .............. 705/14 |
| 6,047,051 | A | 4/2000 | Ginzboorg et al. .......... 379/130 |
| 6,070,192 | A | 5/2000 | Holt et al. ................... 709/227 |
| 6,075,854 | A | 6/2000 | Copley et al. ............... 379/211 |

(Continued)

FOREIGN PATENT DOCUMENTS

WO    WO 98/26381    6/1998

(Continued)

OTHER PUBLICATIONS

Draft—TR45—PN-3-4732-RV4 (to be published as TIA-835.1-D), 32 pages.

(Continued)

*Primary Examiner*—Lester Kincaid
*Assistant Examiner*—Nathan Mitchell
(74) *Attorney, Agent, or Firm*—Baker Botts L.L.P.

(57) ABSTRACT

A method for creating an accounting record in a policy server in a communication network. The method also includes receiving policy data from one or more application layer elements. The method includes receiving accounting data from one or more lower layer elements, such that the accounting data is associated with the policy data. The method also includes consolidating the accounting data and the policy data received.

23 Claims, 3 Drawing Sheets

U.S. PATENT DOCUMENTS

| | | | |
|---|---|---|---|
| 6,131,024 A | 10/2000 | Boltz | 455/405 |
| 6,137,791 A | 10/2000 | Frid et al. | 370/352 |
| 6,141,684 A | 10/2000 | McDonald et al. | 709/222 |
| 6,175,879 B1 | 1/2001 | Shah et al. | 709/330 |
| 6,208,977 B1 | 3/2001 | Hernandez et al. | 705/34 |
| 6,229,887 B1 | 5/2001 | Albers et al. | 379/219 |
| 6,282,573 B1 | 8/2001 | Darago et al. | 709/229 |
| 6,295,447 B1 | 9/2001 | Reichelt et al. | 455/417 |
| 6,330,562 B1 | 12/2001 | Boden et al. | 707/10 |
| 6,332,163 B1 | 12/2001 | Bowman-Amuah | 709/231 |
| 6,339,832 B1 | 1/2002 | Bowman-Amuah | 714/35 |
| 6,434,568 B1 | 8/2002 | Bowman-Amuah | 707/103 R |
| 6,434,628 B1 | 8/2002 | Bowman-Amuah | 714/48 |
| 6,438,594 B1 | 8/2002 | Bowman-Amuah | 709/225 |
| 6,442,748 B1 | 8/2002 | Bowman-Amuah | 717/108 |
| 6,466,964 B1 | 10/2002 | Leung et al. | 709/202 |
| 6,477,580 B1 | 11/2002 | Bowman-Amuah | 709/231 |
| 6,477,665 B1 | 11/2002 | Bowman-Amuah | 714/39 |
| 6,480,485 B1 | 11/2002 | Kari et al. | 370/352 |
| 6,490,451 B1 | 12/2002 | Denman et al. | 455/436 |
| 6,493,547 B1* | 12/2002 | Raith | 455/405 |
| 6,496,850 B1 | 12/2002 | Bowman-Amuah | 709/203 |
| 6,502,213 B1 | 12/2002 | Bowman-Amuah | 714/49 |
| 6,510,513 B1 | 1/2003 | Danieli | 713/156 |
| 6,529,909 B1 | 3/2003 | Bowman-Amuah | 707/10 |
| 6,529,948 B1 | 3/2003 | Bowman-Amuah | 709/217 |
| 6,539,396 B1 | 3/2003 | Bowman-Amuah | 707/103 R |
| 6,549,949 B1 | 4/2003 | Bowman-Amuah | 709/236 |
| 6,550,057 B1 | 4/2003 | Bowman-Amuah | 717/126 |
| 6,571,282 B1 | 5/2003 | Bowman-Amuah | 709/219 |
| 6,578,068 B1 | 6/2003 | Bowman-Amuah | 709/203 |
| 6,601,192 B1 | 7/2003 | Bowman-Amuah | 714/38 |
| 6,601,234 B1 | 7/2003 | Bowman-Amuah | 717/108 |
| 6,606,660 B1 | 8/2003 | Bowman-Amuah | 709/227 |
| 6,611,821 B2 | 8/2003 | Stahl et al. | 705/400 |
| 6,615,199 B1 | 9/2003 | Bowman-Amuah | 706/50 |
| 6,615,253 B1 | 9/2003 | Bowman-Amuah | 709/219 |
| 6,615,263 B2 | 9/2003 | Dulai et al. | 709/225 |
| 6,621,820 B1 | 9/2003 | Williams et al. | 370/395.31 |
| 6,636,242 B2 | 10/2003 | Bowman-Amuah | 715/764 |
| 6,640,238 B1 | 10/2003 | Bowman-Amuah | 709/201 |
| 6,640,244 B1 | 10/2003 | Bowman-Amuah | 709/207 |
| 6,647,262 B1 | 11/2003 | Demetrescu et al. | 455/436 |
| 6,665,537 B1 | 12/2003 | Lioy | 455/435 |
| 6,665,718 B1 | 12/2003 | Chuah et al. | 709/225 |
| 6,671,675 B2 | 12/2003 | Iwamura | 705/30 |
| 6,684,243 B1 | 1/2004 | Euget et al. | 709/222 |
| 6,684,256 B1 | 1/2004 | Warrier et al. | 709/228 |
| 6,708,225 B1 | 3/2004 | Cho et al. | 709/317 |
| 6,714,515 B1 | 3/2004 | Marchand | 370/231 |
| 6,715,145 B1 | 3/2004 | Bowman-Amuah | 718/101 |
| 6,728,266 B1 | 4/2004 | Sabry et al. | 370/468 |
| 6,728,365 B1 | 4/2004 | Li et al. | 379/329 |
| 6,728,884 B1 | 4/2004 | Lim | 713/201 |
| 6,742,015 B1 | 5/2004 | Bowman-Amuah | 718/101 |
| 6,742,036 B1 | 5/2004 | Das et al. | 709/226 |
| 6,757,371 B2 | 6/2004 | Kim et al. | 379/114.22 |
| 6,760,417 B1 | 7/2004 | Wallenius | 379/114.28 |
| 6,760,444 B1 | 7/2004 | Leung | 380/270 |
| 6,768,726 B2 | 7/2004 | Dorenbosch et al. | 370/331 |
| 6,769,000 B1 | 7/2004 | Akhtar et al. | 707/103 R |
| 6,771,623 B2 | 8/2004 | Ton | 370/331 |
| 6,785,256 B2 | 8/2004 | O'Neill | 370/338 |
| 6,804,518 B2 | 10/2004 | Core et al. | 455/436 |
| 6,826,173 B1 | 11/2004 | Kung et al. | 370/352 |
| 6,829,709 B1 | 12/2004 | Acharya et al. | 713/160 |
| 6,834,341 B1 | 12/2004 | Bahl et al. | 713/156 |
| 6,839,338 B1 | 1/2005 | Amara et al. | 370/338 |
| 6,842,906 B1 | 1/2005 | Bowman-Amuah | 719/330 |
| 6,856,676 B1 | 2/2005 | Pirot et al. | 379/201.01 |
| 6,889,321 B1 | 5/2005 | Kung et al. | 713/153 |
| 6,907,501 B2 | 6/2005 | Tariq et al. | 711/118 |
| 6,910,074 B1 | 6/2005 | Amin et al. | 709/227 |
| 6,915,345 B1 | 7/2005 | Tummala et al. | 709/225 |
| 6,917,605 B2 | 7/2005 | Kakemizu et al. | 370/338 |
| 6,920,503 B1 | 7/2005 | Nanji et al. | 709/230 |
| 6,922,404 B1 | 7/2005 | Narayanan et al. | 370/338 |
| 6,925,160 B1* | 8/2005 | Stevens et al. | 379/121.05 |
| 6,947,401 B2 | 9/2005 | El-Malki et al. | 370/331 |
| 6,961,774 B1 | 11/2005 | Shannon et al. | 709/227 |
| 6,967,941 B2 | 11/2005 | Roy | 370/338 |
| 6,978,128 B1 | 12/2005 | Raman et al. | 455/414 |
| 6,980,802 B2 | 12/2005 | Jung | 455/436 |
| 6,980,962 B1 | 12/2005 | Arganbright et al. | 705/26 |
| 6,981,047 B2 | 12/2005 | Hanson et al. | 709/227 |
| 6,982,967 B1 | 1/2006 | Leung | 370/328 |
| 6,990,337 B2 | 1/2006 | O'Neill et al. | 455/422.1 |
| 6,993,333 B2 | 1/2006 | Laroia et al. | 455/436 |
| 7,003,294 B2 | 2/2006 | Singhai et al. | 455/435.1 |
| 7,020,697 B1 | 3/2006 | Goodman et al. | 709/223 |
| 7,024,687 B2 | 4/2006 | Chaudhuri et al. | 726/3 |
| 7,028,311 B2 | 4/2006 | Roach et al. | 719/328 |
| 7,039,027 B2 | 5/2006 | Bridgelall | 370/329 |
| 7,054,268 B1 | 5/2006 | Paranteinen et al. | 370/231 |
| 7,058,165 B2* | 6/2006 | Koskinen et al. | 379/115.03 |
| 7,079,499 B1 | 7/2006 | Akhtar et al. | 370/310 |
| 7,082,301 B2 | 7/2006 | Jagadeesan et al. | 455/436 |
| 7,103,351 B2* | 9/2006 | Chaudhari et al. | 455/414.1 |
| 7,103,359 B1 | 9/2006 | Heinonen et al. | 455/436 |
| 7,127,234 B2 | 10/2006 | Ishii | 455/411 |
| 7,130,286 B2 | 10/2006 | Koodli et al. | 370/331 |
| 7,133,386 B2 | 11/2006 | Holur et al. | 370/331 |
| 7,145,994 B2* | 12/2006 | Moreau et al. | 379/114.01 |
| 7,151,758 B2 | 12/2006 | Kumaki et al. | 370/331 |
| 7,151,772 B1 | 12/2006 | Kalmanek et al. | 370/390 |
| 7,154,868 B1 | 12/2006 | Sharma et al. | 370/331 |
| 7,161,914 B2 | 1/2007 | Shoaib et al. | 370/331 |
| 7,171,555 B1 | 1/2007 | Salowey et al. | 713/156 |
| 7,184,418 B1 | 2/2007 | Baba et al. | 370/331 |
| 7,187,931 B2 | 3/2007 | Trossen | 455/440 |
| 7,190,793 B2 | 3/2007 | Hsu | 380/270 |
| 7,197,763 B2 | 3/2007 | Hsu | 726/4 |
| 7,212,821 B2 | 5/2007 | Laroia et al. | 455/437 |
| 7,230,951 B2 | 6/2007 | Mizell et al. | 370/401 |
| 7,233,583 B2 | 6/2007 | Asthana et al. | 370/332 |
| 7,251,733 B2 | 7/2007 | Haverinen et al. | 713/182 |
| 7,263,371 B2 | 8/2007 | Das et al. | 455/456.1 |
| 7,269,727 B1 | 9/2007 | Mukherjee et al. | 713/160 |
| 7,272,122 B2 | 9/2007 | Trossen et al. | 370/331 |
| 7,272,123 B2 | 9/2007 | Wall | 370/331 |
| 7,275,156 B2 | 9/2007 | Balfanz et al. | 713/168 |
| 7,389,106 B2* | 6/2008 | Dawson et al. | 455/406 |
| 2001/0023428 A1 | 9/2001 | Miyazaki et al. | 709/201 |
| 2002/0021681 A1 | 2/2002 | Madour | 370/331 |
| 2002/0023174 A1 | 2/2002 | Garrett et al. | 709/245 |
| 2002/0036982 A1 | 3/2002 | Chen | 370/230 |
| 2002/0059114 A1 | 5/2002 | Cockrill et al. | 705/27 |
| 2002/0072333 A1* | 6/2002 | Gnesda et al. | 455/67.1 |
| 2002/0091802 A1 | 7/2002 | Paul et al. | 709/220 |
| 2002/0138601 A1 | 9/2002 | Piponius et al. | 709/223 |
| 2002/0151312 A1 | 10/2002 | Rosemarijn Bos et al. | 455/452 |
| 2002/0176377 A1* | 11/2002 | Hamilton | 370/328 |
| 2002/0188712 A1* | 12/2002 | Caslin et al. | 709/223 |
| 2003/0004950 A1 | 1/2003 | Wils et al. | 707/10 |
| 2003/0021252 A1 | 1/2003 | Harper et al. | 370/338 |
| 2003/0039237 A1 | 2/2003 | Forslow | 370/352 |
| 2003/0054795 A1* | 3/2003 | Tamaki et al. | 455/406 |
| 2003/0058839 A1 | 3/2003 | D'Souza | 370/352 |
| 2003/0060188 A1* | 3/2003 | Gidron et al. | 455/408 |
| 2003/0154400 A1 | 8/2003 | Pirttimaa et al. | 713/201 |
| 2003/0187817 A1 | 10/2003 | Agrawal et al. | 707/1 |
| 2003/0217165 A1 | 11/2003 | Buch et al. | 709/229 |
| 2004/0047339 A1 | 3/2004 | Wang et al. | 370/352 |
| 2004/0101117 A1* | 5/2004 | Koskinen et al. | 379/126 |

| | | | | |
|---|---|---|---|---|
| 2004/0107241 | A1 | 6/2004 | Jayapalan et al. | 709/203 |
| 2004/0114553 | A1 | 6/2004 | Jiang et al. | 370/328 |
| 2004/0142679 | A1* | 7/2004 | Kearns et al. | 455/406 |
| 2004/0162876 | A1 | 8/2004 | Kohavi | 709/203 |
| 2004/0162892 | A1 | 8/2004 | Hsu | 709/221 |
| 2004/0196821 | A1 | 10/2004 | Haddad et al. | 370/349 |
| 2004/0210524 | A1 | 10/2004 | Benenati et al. | 705/40 |
| 2004/0259562 | A1 | 12/2004 | Madour | 455/452.2 |
| 2005/0002242 | A1 | 1/2005 | O'Neill et al. | 365/199 |
| 2005/0002407 | A1 | 1/2005 | Shaheen et al. | 370/401 |
| 2005/0009499 | A1* | 1/2005 | Koster | 455/406 |
| 2005/0025132 | A1 | 2/2005 | Harper et al. | 370/352 |
| 2005/0130659 | A1 | 6/2005 | Grech et al. | 455/436 |
| 2005/0149651 | A1 | 7/2005 | Doak et al. | 710/52 |
| 2005/0176428 | A1 | 8/2005 | Gabor et al. | 455/435.1 |
| 2005/0191989 | A1* | 9/2005 | Plush et al. | 455/406 |
| 2005/0195766 | A1 | 9/2005 | Nasieiski et al. | 370/331 |
| 2005/0201324 | A1 | 9/2005 | Zheng | 370/328 |
| 2005/0213606 | A1* | 9/2005 | Huang et al. | 370/467 |
| 2005/0220039 | A1 | 10/2005 | Hoshino et al. | 370/261 |
| 2005/0278420 | A1 | 12/2005 | Hartikainen et al. | 709/203 |
| 2005/0286709 | A1 | 12/2005 | Horton et al. | 379/265.09 |
| 2006/0014547 | A1 | 1/2006 | Walter | 455/456.1 |
| 2006/0018272 | A1 | 1/2006 | Mutikainen et al. | 370/328 |
| 2006/0077924 | A1 | 4/2006 | Rune | 370/328 |
| 2006/0116113 | A1* | 6/2006 | Gass | 455/414.4 |
| 2006/0126630 | A1 | 6/2006 | Shirazipour et al. | 370/392 |
| 2006/0171310 | A1 | 8/2006 | Ahluwalia et al. | 370/229 |
| 2006/0251038 | A1 | 11/2006 | Tamura et al. | 370/342 |
| 2006/0264207 | A1 | 11/2006 | Tamura et al. | 455/415 |
| 2006/0268819 | A1 | 11/2006 | Chen et al. | 370/349 |
| 2007/0008882 | A1 | 1/2007 | Oran | 370/229 |
| 2007/0036312 | A1 | 2/2007 | Cai et al. | 379/126 |
| 2007/0086582 | A1 | 4/2007 | Tai et al. | 379/114.01 |
| 2007/0094712 | A1 | 4/2007 | Gibbs et al. | 726/3 |
| 2007/0121615 | A1 | 5/2007 | Weill et al. | 370/389 |
| 2007/0121642 | A1 | 5/2007 | Battin et al. | 370/395.2 |
| 2007/0153720 | A1 | 7/2007 | Baglin et al. | 370/328 |
| 2007/0213031 | A1* | 9/2007 | Ejzak et al. | 455/406 |
| 2007/0220553 | A1 | 9/2007 | Branam et al. | 725/46 |
| 2007/0254661 | A1 | 11/2007 | Chowdhury et al. | 455/436 |
| 2008/0311884 | A1* | 12/2008 | Ala-Laurila et al. | 455/406 |

FOREIGN PATENT DOCUMENTS

| | | |
|---|---|---|
| WO | WO 99/31610 | 6/1999 |
| WO | WO 2005/107297 | 11/2005 |

OTHER PUBLICATIONS

Draft—TR45—PN-3-4732-RV4 (to be published as TIA-835.2-D), 93 pages.

Draft—TR45—PN-3-4732-RV4 (to be published as TIA-835.3-D), 36 pages.

Draft—TR45—PN-3-4732-RV4 (to be published as TIA-835.4-D), 70 pages.

Draft—TR45—PN-3-4732-RV4 (to be published as TIA-835.5-D), 72 pages.

Draft—TR45—PN-3-4732-RV4 (to be published as TIA-835.6-D), 36 pages.

3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.

3GPP2 X.S0011-001-D, 3rd Generation Partnership Project 2 '3GPP2', "cdma2000 Wireless IP Network Standard: Introduction," Version 1.0, 33 pages, Feb. 2006.

3GPP2 C.S0063-0, 3rd Generation Partnership Project 2 '3GPP2', "cdma2000 High Rate Packet Data Supplemental," Version 1.0, 127 pages, Mar. 2006.

3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.

3GPP2 C.S0024-A, 3rd Generation Partnership Project 2 '3GPP2', "cdma2000 High Rate Packet Data Air Interface Specification," Version 2.0, 1,223 pages, Jul. 2005.

B. Aboba, et al., "Extensible Authentication Protocol (EAP)," Network Working Group, RFC 3748, http://www.ietf.org/rfc/rfc3748.txt, 59 pages, Jun. 2004.

B. Aboba, D. Simon, "PPP EAP TLS Authentication Protocol," Network Working Group, RFC 2716, http://www.ietf.org/rfc/rfc2716.txt, 22 pages, Oct. 1999.

W. Simpson, "PPP Challenge Handshake Authentication Protocol (CHAP)," Network Working Group, RFC 1994, http://www.ietf.org/rfc/rfc1994.txt, 12 pages, Aug. 1996.

W. Simpson, "The Point-to-Point (PPP)," Network Working Group, RFC 1661, http://www.ietf.org/rfc/rfc1661.txt, 47 pages, Jul. 1994.

P. Eronen, et al., "Diameter Extensible Authentication Protocol (EAP) Application," Network Working Group, RFC 4072, http://www.ietf.org/rfc/rfc4072.txt, 29 pages, Aug. 2005.

P. Calhoun, et al., "Diameter Base Protocol," Network Working Group, RFC 3588, http://www.ietf.org/rfc/rfc3588.txt, 129 pages, Sep. 2003.

3rd Generation Partnership Project 2 "3GPP2"; "All-IP Core Network Multimedia Domain: Service Based Bearer Control—Stage 2;www.3gpp2.org-"; Version 1.0. Draft Version 0.21.0, 49 pages.

PCT Notification of Transmittal of the International Search Report and the Written Opinion of the International Searching Authority, or the Declaration, International Application No. PCT/US07/05849, 9 pages, Nov. 14, 2007.

Yegani et al., "System and Method for Access Authentication in a Mobile Wireless Network," U.S. Appl. No. 11/419,382, 20 pps, 3 pps drawings, filed May 19, 2006.

Yegani et al., "System and Method for Handover of an Access Terminal in a Communication Network," U.S. Appl. No. 11/682,735, 24 pps, 3 pps drawings, filed Mar. 6, 2007.

Yegani et al., "Enforcement of User Level Policies from Visited Networks in a Mobile IP Environment," U.S. Appl. No. 11/682,817, 22 pps, 2 pps drawings, filed Mar. 6, 2007.

Yegani et al, Authentication of Access Terminals in a Cellular Communication Network,: U.S. Appl. No. 11/682,857, 28 pps, 5 pps drawings, filed Mar. 6, 2007.

Andreasen et al., "System and Method of Consolidating Accounting Data for a Communication Session," U.S. Appl. No. 11/714,974, 40 pps, 3 pps drawings, filed Mar. 6, 2007.

Panda et al., "System and Method for Capturing Accounting Data for a Communication Session," U.S. Appl. No. 11/715,018, filed Mar. 6, 2007.

Rosenberg et al., "System and Method for Determining a Network for Processing Applications for a Communication Session," U.S. Appl. No. 11/715,019, 40 pps, 3 pps drawings, filed Mar. 6, 2007.

Rosenberg et al., "Determining a Policy Output for a Communication Session," U.S. Appl. No. 11/715,032, 31 pps, 4 pps drawings, filed Mar. 6, 2007.

Leung et al., "Communicating Packets Using a Home Anchored Bearer Path," U.S. Appl. No. 11/715,033, 33 pps, 4 pps drawings, filed Mar. 6, 2007.

Andreasen et al., "Posture-Based Network Authentication," U.S. Appl. No. 11/715,040, 23 pages, 2 pps drawings, filed Mar. 6, 2007.

Iyer et al., "Access Terminal for Communicating Packets Using a Home Anchored Bearer Path," U.S. Appl. No. 11/715,041, 33 pps, 4 pps drawings, filed Mar. 6, 2007.

Rosenberg et al., "System and Method for Exchanging Policy Information in a Roaming Communications Environment,"U.S. Appl. No. 11/715,056, 42 pps, 3 pps drawings, filed Mar. 6, 2007.

Rosenberg et al., "Establishing Facets of a Policy for a Communication Session," U.S. Appl. No. 11/715,065, 32 pps, 4 pps drawings, filed Mar. 6, 2007.

Rosenberg et al., "Performing Deep Packet Inspection for a Communication Session," U.S. Appl. No. 11/715,073, 31 pps, 4 pps drawings, filed Mar. 6, 2007.

Rosenberg et al., "Assigning a Serving- CSCF During Access Authentication," U.S. Appl. No. 11/715,074, 22 pps, 2 pps drawings, filed Mar. 6, 2007.

Rosenberg et al., "System and Method for Providing Emergency Services in a Visited Communications Environment," U.S. Appl. No. 11/715,111, 39 pps, 2 pps drawings, filed Mar. 6, 2007.

Panda et al., "Application-Aware Policy Enforcement," U.S. Appl. No. 11/715,187, 28 pps, 2 pps drawings, filed Mar. 6, 2007.

Andreasen et al., "Network-triggered quality of service (QoS) Reservation," U.S. Appl. No. 11/715,250, 21 pps, 2 pps drawings, filed Mar. 6, 2007.

Andreasen et al.,; "Policy-Based Control of Content Intercept", U.S. Appl. No. 11/715,251, 23 pps, 2 pps drawings.

Rosenberg et al., "System and Method for Network Charging Using Policy Peering," U.S. Appl. No. 11/715,256, 43 pps, 3 pps drawings, filed Mar. 6, 2007.

Online Inc., "Apogee Releases Content Usage-Based Billing Product Annotated Title—Software allows content usage-based billing," EContent, vol. 24, No. 5, NDN 173-0356-6509-7, 1 pg, Jul. 2001.

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg, Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs, Jan. 1998.

Business Wire, "Apogee Networks Introduces Industry's First Content Usage-Based Billing Solution for Web Hosters," NDN 219-0281-6988-1, 2 pgs, May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs, Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs, Oct. 10, 2000.

Business Wire, "Apogee Networks Unveils NetCountant Wireless Billing At SUPERCOMM; Company Demonstrates Industry First Wireless Content Usage Based Billing Solution," NDN 218-0324-8075-6, 2 pgs, Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs, Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs, Dec. 6, 2000.

Business Wire, "Apogee Networks Joins Content Alliance; Billing Expert to Join Industry Group Aimed At Advancing Content Networking," NDN 218-0181-2716-7, 3 pgs, Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs, Jun. 19, 2000.

Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).

Notification of Transmittal of the International Search Report and the Written Opinion of the International Searching Authority, or the Declaration, International Application No. PCT/US07/05847, 9 pages, mailed Oct. 26, 2007.

PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages.

PCT Notification of Transmittal of the International Search Report and the Written Opinion of the International Searching Authority, or the Declaration with attached PCT International Search Report and Written Opinion of the International Searching Authority in International Application No. PCT/US2006/046800, (10 pgs), Nov. 10, 2008.

*Unites States Patent and Trademark Office, Office Action* for U.S. Appl. No. 11/714,974, filed Mar. 6, 2007 in the name of Andreasen et al., (9 pgs), notification date Mar. 20, 2009.

*United States Patent and Trademark Office, Office Action* for U.S. Appl. No. 11/715,018, filed Mar. 6, 2007 in the name of Andreasen et al., (10 pgs), notification date Mar. 12, 2009.

*United States Patent and Trademark Office, Office Action* for U.S. Appl. No. 11/714,974, filed Mar. 6, 2007 in the name of Andreasen et al., (12 pgs), Notication Date Oct. 21, 2009.

*US Patent and Trademark Office, Notice of Allowance and Fee (s ) Due/Notice of Allowability* for U.S. Appl. No. 11/715,018, Filed Mar. 6, 2007, Inventor Flemming S. Andreasen, 6 pages, Mailing Date Nov. 12, 2009.

*United States Patent and Trademark Office, Office Action* for U.S. Appl. No. 11/741,974, filed Mar. 6, 2007 in the name of Andreasen et al., (13 pgs), Notification Date Mar. 22, 2010.

3GPP TS 32.299 V7.3.0 (Sep. 2006), 3rd Generation Partnership Project; Technical Specification Group Service and System Aspects; Telecommunication Management; Charging Management; Diameter Charging Applications (Release 7), 101 pages.

3GPP TS 32.260 V7.0.0 (Sep. 2006), 3rd Generation Partnership Project; Technical Specification Group Service and System Aspects; Telecommunication Management; Charging Management; IP Multimedia Subsystem (IMS) charging (Release 7), 72 pages, 2006.

PacketCable ™ Specification; Multimedia Specification; PKT-SP-MM-102-051221; Issued, 149 pages, Dec. 2005.

\* cited by examiner

SYSTEM AND METHOD FOR GENERATING A UNIFIED ACCOUNTING RECORD FOR A COMMUNICATION SESSION

RELATED APPLICATION

This application claims benefit under 35 U.S.C. §119(e) of U.S. Provisional Application Ser. No. 60/780,176, entitled "VERIZON WIRELESS MULTI-MEDIA PLUS (MMD+) PROGRAM SYSTEM ARCHITECTURE DOCUMENT," filed Mar. 6, 2006, by Flemming Andreasen et al., which is incorporated herein by reference.

TECHNICAL FIELD

This invention relates generally to the field of telecommunications and, more particularly, to accounting data for a communication session.

BACKGROUND OF THE INVENTION

An endpoint, such as an access terminal, may use a system of communication networks to communicate packets with other endpoints during communication sessions. For example, an access terminal may subscribe to a network that maintains subscription information for the access terminal.

Certain known techniques may be used to make accounting records for these communication sessions. These known techniques, however, are not efficient in certain situations. In certain situations, it is generally desirable to be efficient.

SUMMARY OF THE INVENTION

In accordance with the present invention, disadvantages and problems associated with previous techniques for creating accounting records may be reduced or eliminated.

In accordance with one embodiment of the present invention, a method for creating an accounting record by a policy server in a communication network is provided. The method includes the policy server receiving accounting data from one or more lower layer elements. The method also includes the policy server receiving policy data from one or more application layer elements. The method also includes the policy server consolidating the accounting data received.

In accordance with another embodiment of the present invention, the method for creating an accounting record in a communication network includes the policy server processing the accounting data into a unified format, the unified format being compatible with the charging data function. The method also includes the policy server sending the consolidated and unified accounting data to a services data manager.

Important technical advantages of certain embodiments of the present invention include making it easier to introduce new application services that require only duration based billing. Application services do not need to implement accounting interfaces if they require only duration based billing, and the accounting infrastructure, such as SDM, does not need to accommodate interfaces to such new application services either.

Other important technical advantages of certain embodiments of the present invention include significantly reducing the load on the billing system, since the billing system does not need to correlate accounting information received from a multitude of entities. This reduces the overall number of accounting messages and simplifies accounting data consolidation in the CDF, which reduces overall processing. This also simplifies overall operation and management of system by reducing the number of elements that need to communicate directly with CDF.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
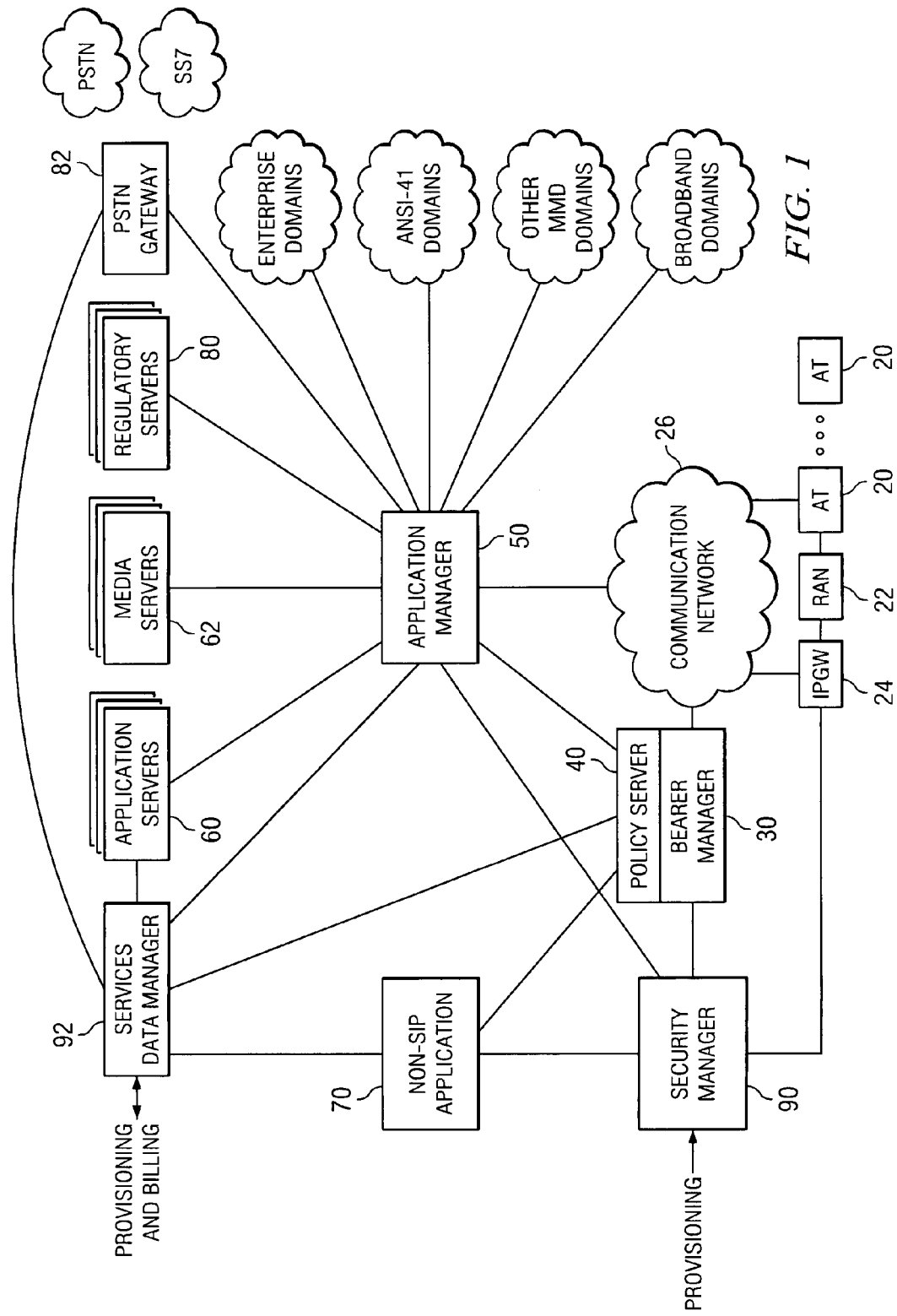
FIG. 1 is a simplified block diagram that illustrates a system that communicates packets for an access terminal in accordance with an embodiment of the present invention.

For purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

In one embodiment of the present invention, capturing accounting data in an all-IP next generation network architecture is implemented. It is based on an enhanced IMS architecture with a policy server framework that applies to both SIP and non-SIP applications. Applications (both SIP and non-SIP) interact with the policy manager to have network resource usage authorized and the policy manager in terms interact with the Bearer Manager to authorize network resource usage.

When users use network and application resources, it is important to capture accounting information for that use. This enables the service provider to charge the user for the application and/or network resource use, manage, and troubleshoot services, etc.

In traditional IMS-based architectures (3GPP, 3GPP2, TISPAN, PacketCable 2.0, etc.), this is achieved by having nearly all of the components in the network generate accounting information—application servers, the CSCFs, and bearer components. This leads to load on the billing systems and processing to correlate the information. It also makes it more difficult to introduce new (non-SIP) application services, since they need to generate their own accounting information, send it to a charging gateway function, which must be configured to receive and process it, etc. Furthermore, traditional IMS-based architectures generally do not consider application level accounting for non-SIP applications.

The all-IP next generation network architecture supports network mobility in the form of macro-mobility as well as micro-mobility. Macro-mobility is provided by anchoring a user's IP-address on a so-called bearer manager. The bearer manager in turn communicates with an IP Gateway (IPGW), which uses Proxy Mobile IP procedures to support inter-IPGW handover. The IPGW in turn communicates with the access network (e.g. EVDO Rev A RAN).

Bearer manager is analogous to a home agent in a traditional 3GPP2 architecture and as a GGSN in a traditional 3GPP architecture. Similarly, the IPGW is analogous to a PDSN in 3GPP2 and an SGSN in 3GPP.

When users use network resources, it is important to capture accounting information for that use. This enables the service provider to charge the user for the network resource use, manage and troubleshoot services, etc.

In traditional IMS-based architectures (3GPP, 3GPP2, TISPAN, PacketCable 2.0, etc.), this is achieved by having individual bearer level components in the network generate accounting information. The IMS charging architecture defines the Charging Trigger Function (CTF) as the logical element doing this, and the accounting data is then sent to a Charging Data Function (CDF) or a Charging Gateway Function (CGF) for further handling and consolidation (using the Rf interface).

There are, however, a few complications associated with this. First of all, if a user is mobile and handovers are performed (e.g. between IPGWs), the CGF may receive accounting data from a multitude of elements for a single session. This complicates the overall system, and requires additional processing and interface configuration on the CGF. Secondly, in the all-IP next generation network architecture, different access networks are supported and handovers may be performed between different types of access network technologies, each of which produce different types of accounting information. For example, an IPGW (or IPGW/PDIF) may use DIAMETER (3GPP2 Rf-based), and a traditional home agent may use RADIUS messages. This implies that the CDF must support a variety of different accounting protocols and be able to produce consolidated records based on that. The all-IP next generation network architecture defines a solution to both of these problems.

3GPP IMS defines the off-line charging architecture. Some of the off-line architecture is reused, and in particular the notion of Charging Trigger Function (CTF) and Charging Data Function (CDF). However, the all-IP next generation network architecture provides some important overall system simplifications and introduces the notion of a Charging Trigger Consolidator Function (CTCF). The all-IP next generation network architecture also provides an accounting solution for non-SIP applications.

FIG. 1 is a simplified block diagram of a system 10 that communicates packets for an access terminal 20. According to the embodiment, system 10 includes a radio access network (RAN) 22, an Internet Protocol (IP) gateway (IPGW) 24, a communication network 26, a bearer manager 30, a policy server 40, an application manager 50, application servers 60, media servers 62, non-SIP applications 70, regulatory servers 80, PSTN gateway 82, security manager 90, and services data manager 92.

In accordance with the teachings of the present invention, application level elements and bearer level elements communicate with policy server 40. Therefore, policy server 40 can use software to generate a unified accounting record that captures policy data for applications (for example, start and stop times) as well as application's associated use of network resources (for example, total number of bytes and packets used). Applications 50, 70 can inform policy server 40 of at least its name, start time, stop time, parameters associated with application flow, and additional data with application. Bearer manager 30 can inform policy server 40 of the network resources that are used for the session.

Note that, due to their flexibility, these components may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of ARF 74, CDF 75, CGF 77, bearer manager 30, application manager 50, non-SIP applications 70, and policy server 40 in the context of communications system 10 and, accordingly, they should be construed as such.

Figure 2:
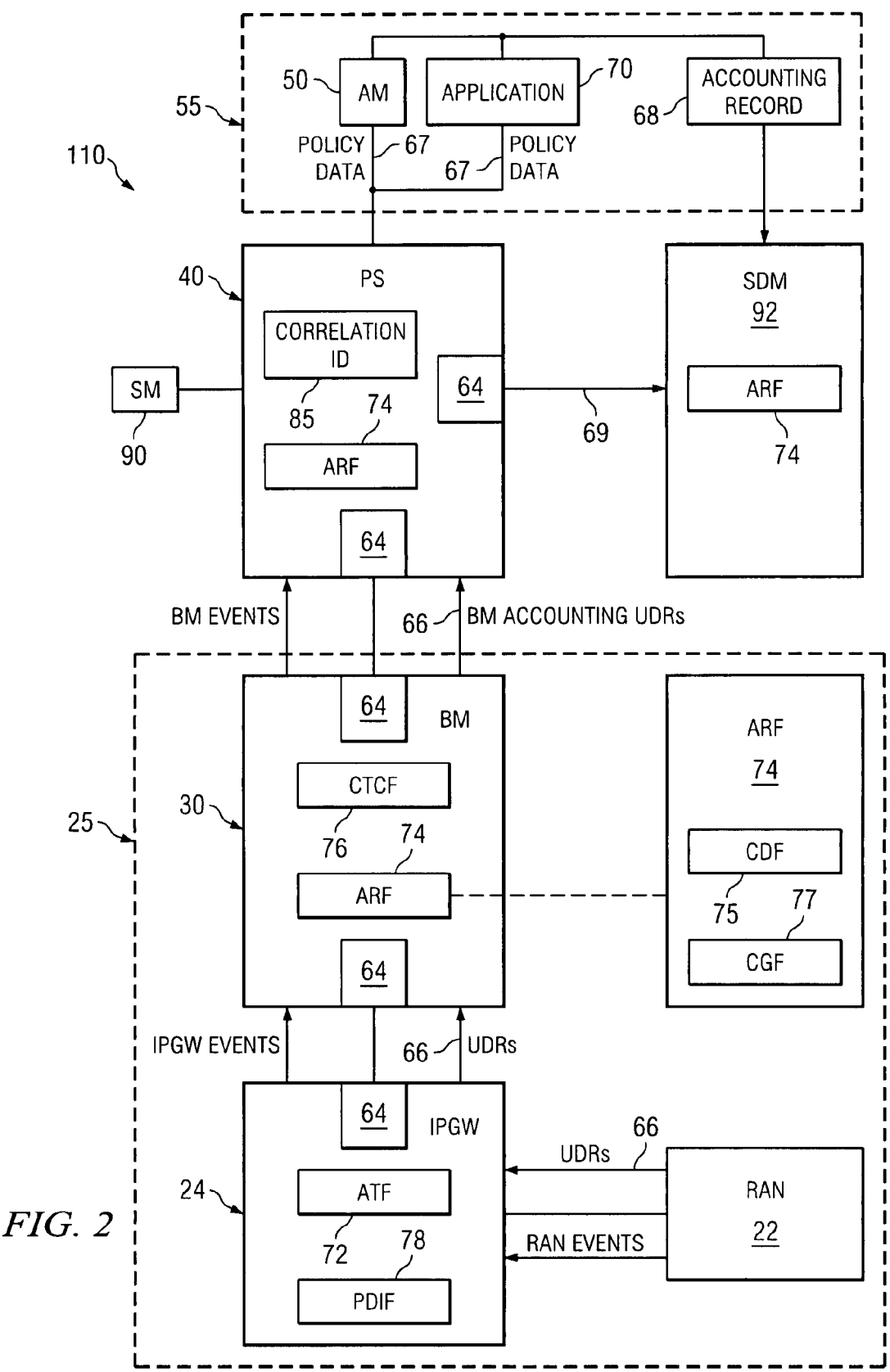
FIG. 2 is a simplified block diagram that illustrates an accounting model in accordance with an embodiment of the present invention.

It should be noted that the internal structure of the system of FIG. 1 and FIG. 2 are versatile and can be readily changed, modified, rearranged, or reconfigured in order to achieve its intended operations or additional operations. Additionally, any of the items within FIGS. 1 and 2 may be combined, where appropriate, or replaced with other functional elements that are operable to achieve any of the operations described herein.

System 10 offers several advantages by using accounting model that generates a single accounting record in a policy server. An accounting model makes it easier to introduce new application services that only require duration-based and/or traffic volume based billing. Application services do not need to implement accounting interfaces if they require only duration based and/or traffic volume based billing, and the accounting infrastructure, such as SDM, does not need to accommodate interfaces to such new application services either.

Accounting model in system 10 also offers other advantages, such as significantly reducing the load on the billing system, since the billing system does not need to correlate accounting information received from a multitude of entities. In addition, Accounting model allows a simpler overall operation and management of system. Details relating to these operations are explained below in FIG. 2 and FIG. 3.

According to the illustrated embodiment, system 10 provides services such as communication sessions to endpoints such as access terminal 20. A communication session refers to an active communication between endpoints. Information may be communicated during a communication session. Information may include voice, data, text, audio, video, multimedia, control, signaling, and/or other information. Information may be communicated in packets, each comprising a bundle of data organized in a specific way for transmission.

System 10 may utilize communication protocols and technologies to provide communication sessions. Examples of communication protocols and technologies include those set by the Institute of Electrical and Electronics Engineers, Inc. (IEEE) standards, the International Telecommunications Union (ITU-T) standards, the European Telecommunications Standards Institute (ETSI) standards, the Internet Engineering Task Force (IETF) standards (for example, IP such as mobile IP), or other standards.

According to the illustrated embodiment, access terminal 20 represents any suitable device operable to communicate with a communication network. For example, a subscriber may use access terminal 20 to communicate with a communication network. Access terminal 20 may comprise, for example, a personal digital assistant, a computer such as a laptop, a cellular telephone, a mobile handset, and/or any other device operable to communicate with system 10. Access terminal 20 may be a mobile or fixed device.

System 10 includes a communication network 26. In general, communication network 26 may comprise at least a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication links, or any combination of any of the preceding.

Radio access network 22 provides access services to access terminals 20. For example, radio access network 22 may provide Layer 2 mobile access, mobility, and/or handoff services within its area of coverage. Alternatively, access terminals 20 can also access the network through alternative mechanisms, such as WiFi or 1×RTT data.

IP gateway 24 operates as a gateway between radio access network 22 and communication network 26. IP gateway 24 may perform operations such as authenticating access terminal 20, assigning a bearer manager 30 to access terminal 20, performing handoff functions between different IP gateways 24, and radio access network 22, and/or facilitating registration of access terminal 20 to communication network 26. Because IP gateway 24 performs such functions as authentication, handoff and context transfer in ways that are not access network specific, system 10 allows for roaming and handoff functions seamlessly across these different access network technologies.

Bearer manager 30 provides bearer paths that communicate packets to and/or from access terminal 20. According to one embodiment, a bearer manager 30 operates as an anchor for a bearer path. Bearer manager 30 may operate as a home or foreign agent that authorizes use of a network address that allows access terminal 20 to use the bearer path anchored by bearer manager 30. Because of its role as the IP anchor point, bearer manager 30 can also act as the natural enforcement point for several network policies, such as quality of service, accounting, and mobility.

Bearer manager 30 may perform other suitable operations to provide services to access terminal 20. Examples of other suitable operations include processing signaling, committing resources, and maintaining gateways for access terminal 20. A bearer manager 30 may comprise any suitable device, for example, a Serving General Packet Radio Services (GPRS) Support Node (SGSN), a Gateway GPRS Support Node (GGSN), a home/foreign agent, a mobile gateway, a mobile IPv4 node, a mobile IPv6 node, or a Packet Data Serving Node (PDSN). A bearer manager 30 may use any suitable protocol, for example, an IP Multimedia Subsystem (IMS) protocol.

Policy server 40 manages policies. Policy server 40 is responsible for implementing the policies that govern how the underlying IP network (such as IP gateway 24, bearer manager 30, and radio access network 22) is utilized in support of the applications (such as SIP and non-SIP applications) that run on top of the network. Policy server 40 controls bearer manager 30 and IP gateway 24 by providing it with policies, called facets, which bearer manager 30 and IP gateway 24 execute. Policy server 40 is contacted by numerous elements in the network for decisions on how they should proceed, such as situations where such decisions impact the underlying use of the IP network. A policy may include one or more policy rules, where a policy rule specifies an action to be taken if one or more conditions are satisfied. A policy may include facets, which are policy rules that may be installed and executed on a network element. A facet may allow a network element to make policy decisions. Policy server 40 may be coupled with bearer manager 30.

Application manager 50 manages applications, such as SIP applications and/or other suitable applications. Application manager 50 can perform SIP operations (such as SIP registration, authorization, and routing), voice features (such as call routing and call forwarding), Service Capabilities Interaction Management (SCIM), user presence services, and/or other operations. Application manager 50 is responsible for invoking SIP-based application servers 60, which can provide services like IP centrex and Push-To-Talk. Application manager 50 may communicate with policy server 40 to request a policy to be implemented on its behalf for a particular access terminal 20. Application manager 50 can also inform policy server of SIP session requests so that network can be properly configured to support these sessions.

System 10 supports two different types of applications: SIP-based applications and non-SIP applications. SIP-based application servers 60 reside on top of application manager 50, and application servers 60 are accessed using the IMS Service Control (ISC) interface. SIP-based application servers 60 can provide services like IP centrex and Push-To-Talk. However, access to these applications and coordination of underlying network resources in support of SIP applications is managed by policy server 40, which communicates with application manager 50.

System 10 also supports non-SIP applications. Non-SIP application servers 70 can be invoked directly by access terminal 20 or through other triggers. Communication interface between the non-SIP application servers 70 and policy server 40 is identical to the communication between application manager 50 and policy server 40. This communication interface can be based on DIAMETER or any other suitable interface.

Media servers 62 represent coarse-grained application components that are not useful applications by themselves, but are useful when used by other applications. Application servers 60 may need access to media processing functions (such as Interactive Voice Response), mixing functions, and messaging functions. Rather than have each application server 60 implement these functions separately, the functions are extracted into a common set of media servers 62. Media servers 62 are also known as service enablers.

Regulatory server 80 provides an interface for installation of intercept orders from law enforcement agencies, and the collection of data from the network for delivery to law enforcement agencies. System 10 is operable to interconnect with the PSTN through traditional SIP-based PSTN gateways 82.

Security manager 90 is the central access point for security services in system 10. Authentication at all layers takes place through interactions with security manager 90 since security manager 90 acts as the central repository and generation point for keying materials. Security manager 90 is the core of the Security Operations Center (SOC), which provides continuous management of threats in system 10.

Services data manager (SDM) 92 stores subscriber data for access terminals 20. Components needing access to subscriber data, including application manager 50, policy server 40, SIP application servers 60, and non-SIP application servers 70, obtain subscriber data from SDM 92. Since numerous protocols and devices are used in system 10, each with potentially different identifiers, SDM 92 acts as the repository for the subscriber data. SDM 92 is operable to relate various identifiers used within system 10. SDM 92 provides basic Create/Read/Update/Delete (CRUD) services on the subscriber data, and SDM 92 stores subscriber data. SDM 92 also serves as the repository of accounting records for subscriber use in system 10. Accounting records are read by back-end billing systems for correlation and billing. SDM 92 also stores various pieces of non-subscriber data, such as PSTN routing logic. Provisioning systems can interface with SDM 92 by pushing subscriber data into SDM 92 and reading it out.

A component of system 10 may include any suitable arrangement of elements, for example, an interface, logic, memory, other suitable element, or combination of any of the preceding. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Certain logic, such as a processor, may manage the operation of a component. Examples of a processor include one or more computers, one or more microprocessors, one or more applications, and/or other logic.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

For purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

There are two types of records in accounting model. Accounting records are generated by application manager 50 and/or application servers 60, and represent details of the operation of application manager 50 or application server 60 in providing a specific application. Accounting records are sent to SDM at the end of an application session. In the case of SIP, this would mean the end of a call.

The other type of records is Usage Data Records (UDRs). UDR is an account of the usage of the underlying IP network and its resources. UDRs, like accounting records, are typically generated at the end of an IP session, but can be generated upon other events as well, such as exceeding a threshold of usage. UDRs can also include information on the application that caused the utilization of the IP network. As a result, UDRs alone are often sufficient as the primary record of network usage, making application manager and application server accounting records optional.

Each component in the framework builds on a collection of events received, and also records usage data corresponding to the resources used. The accounting collection is done corresponding to the accounting facets set by policy server, as well as default policies on each component.

The components in the network may also report events based on instructions in the accounting facets. For example, if IPGW has an accounting facet installed, which requires IPGW to trigger on 1 MB of usage data on a classifier, IPGW reports this event to bearer manager, and sends out the packet counters corresponding to the specific classifier. Additional events include registration, de-registration, mobility and QoS.

Accounting model attempts to minimize the number of points in system 10, which generate accounting records, and reduces the set of independent events from various components. Correlation functions are not overburdened with excessive events from various components. In addition, correct event reporting and consolidation into UDRs via bearer manager and policy server enable new applications to be deployed without requiring the applications themselves to generate charging records, or accounting events.

UDRs are collected by each network component and reported on certain defined events, typically the end of an IP session or an IP flow. The consolidation of UDRs is also done as they are reported, in a chained way as shown below in FIG. 2. UDRs from RAN are consolidated into UDRs from IPGW, and then sent to bearer manager. Bearer manager consolidates UDRs received from IPGW with its own UDRs, and sends consolidated UDRs to policy server. Policy server does a similar consolidation after recording additional events known to policy server, and sends consolidated UDRs to SDM.

The records are retrieved by the billing system from SDM, and can also use SDM as a repository for the accounting data.

The various accounting events reported by RAN include network entry, QoS, and change in AT state (dormant/idle). RAN also reports UDRs, which include radio link usage, and usage duration for RAN resources corresponding to a particular AT.

IPGW collects additional accounting data corresponding to the accounting facets installed, as well as usage data corresponding to the IP sessions that are active. The accounting facets may trigger an event to bearer manager, based on the triggering condition. All events, which are sent to bearer manager, also include the accounting usage data corresponding to the specific classifier. The packet counters corresponding to the facets are reset when the event is reported to bearer manager.

In addition to the accounting facets installed by bearer manager, IPGW has a default facet, which enables it to collect usage data corresponding to the IP sessions active for a particular AT, which includes both the visited IP address, as well as the home IP address. The usage data corresponding to all accounting facets containing a non-zero packet counter, is reported as UDRs on a de-registration event, or based on a periodic interval. UDRs reported by RANs are also recorded within these UDRs as containers.

Similarly, bearer manager has a default facet corresponding to the subscriber IP address as well as facets installed by policy server. All events corresponding to accounting facets containing packet counters reported to bearer manager from IPGW are recorded at bearer manager into UDRs for the specific facet. UDRs recording at bearer manager also help in consolidating the data reported across mobility events from several IPGWs. UDRs from bearer manager are reported to policy server either at the end of the subscriber session or at defined periodic intervals.

Various system events in bearer manager, as well as application manager are reported to policy server. Policy server receives events from both application manager and bearer manager, and records these along with UDRs from bearer manager, and the consolidated UDR is then sent to SDM.

QoS and Accounting facets are installed by policy server at a per session/per application flow that controls the usage of resources at bearer manager. The accounting facets dictate the modality of bearer accounting, (e.g.: time, volume) for the specific application flows defined by the classifiers. Events corresponding to dynamic facets installed by policy server report the packet counters on the trigger conditions—threshold and/or time. The packet counters are then reset after the reporting event for the next trigger condition. Policy server can further generate accounting data records that consolidate events received at a per-session basis from bearer manager as well as the events reported by application manager. This information is useful in both consolidation and correlation of accounting related to dynamic QoS, as well as allowing applications. For example, a new application service wherein charging is not enabled at the application layer, but the provider can still charge based on the specific application usage.

Accounting model encompasses both the SIP and non-SIP applications, as well as over the top applications. In most cases, the above-mentioned procedures, which generate UDRs from policy server, are sufficient to enable new applications, without requiring the applications to generate accounting data.

In certain scenarios, it may be necessary for additional information regarding the application that is not recorded or collected via policy server or bearer manager. To handle scenarios, which require application based accounting, the specific non-SIP application server or application manager can record events, which may be used for accounting. For non-SIP applications, these could be enabled by the specific application servers or using application detection using deep packet inspection.

Charging correlation is required for two reasons: Correlation between home and visited network, as well as correlation between usage at the application layer (application manager and application server) and the bearer layer (bearer manager and IPGW) for specific application sessions.

A bearer correlation identifier is allocated per Mobile IP user session by bearer manager in the home network, and sent to the visited network via policy peering. The bearer correlation identifier is used by both the visited bearer manager and home bearer manager in UDRs generated corresponding to the Mobile IP session.

A dynamic correlation identifier is used per application session (i.e., SIP call or streaming media session) to correlate usage at the application layer with the IP network. For application requests initiated by ATs, the application manager or non-SIP application server contacts policy server for authorization. Policy server generates the correlation key, and passes it to application manager or non-SIP application server. The same key is passed to bearer manager and IPGW as part of the accounting facets. However, in the case of SIP calls initiated by PSTN gateways, the correlation identifier may be allocated by the originating gateway, carried in the SIP signaling message, and then passed from application manager to policy server. Accounting records generated by the PSTN gateway, application manager, or application server, and UDRs generated by policy server, include this correlation identifier.

Accounting model enables bearer manager and policy server in the visited network to collect and report the information to the visited accounting server. The home network collects all the accounting information for the traffic via the home network, as well as the sessions under home control. When a user roams into a visited network, initial access authentication is performed, and at the end of access authentication, the visited network is allocated a bearer correlation identifier by the home network, corresponding to the Mobile IP session.

All UDRs related to the Mobile IP session (as opposed to dynamic application sessions) are sent to the V-SDM and the H-SDM and contain the bearer correlation identifier. This identifier is then used for any offline settlements, across the visited and home providers.

For dynamic sessions, the correlation identifier is assigned in the home network, as described above. Policy server passes this identifier to the visited network through the policy peering interface, as part of the accounting facets passed interprovider. At the end of the IP session, policy server can de-install the facets that were created at the start of the session. The response to this de-installation can include the final values of the counters associated with the accounting facets. This allows the home network to immediately learn about resource usage in the visited network. In addition, accounting records sent from the V-policy server to its SDM for visited network usage can include the home-allocated correlation identifier. This allows the home and visited networks to reconcile detail records periodically as needed.

FIG. 2 illustrates an example of an accounting model 110 that may be used with system 10 of FIG. 1. In one embodiment, accounting model 110 includes RAN 22, IPGW 24, bearer manager 30, policy server 40, SDM 92, application manager 50, non-SIP applications 70, and security manager 90. In this particular embodiment, bearer level elements 25 include RAN, IPGW, and bearer manager. In this particular embodiment, application level elements 55 include application manager and applications. In one embodiment, accounting trigger function (ATF) and Packet Data Interworking Function (PDIF) are located in IPGW 24. Charging trigger consolidator function (CTCF) 76 can be located in bearer manager 30. Accounting receiving function (ARF) 74 can include or be a combination of a charging data function (CDF) 75 and/or charging gateway function (CGF) 77, such that ARF can be located in policy server 40. In some embodiments, policy server 40 contains CTCF 76 and ATF 72. In some embodiments, SDM 92 contains CDF 75, and/or CGF 77. Accounting data 66 and policy data 67 are produced from various components in accounting model 110.

Accounting model 110 attempts to minimize the number of points in system 10, which generate accounting data 66, and reduces the set of independent events from various components. Correlation functions are not overburdened with excessive events from various components. In addition, correct event reporting and consolidation into UDRs 66 via bearer manager 30 and policy server 40 enable new applications to be deployed without requiring the applications 70 themselves to generate charging records, or accounting events. Accounting model 110 encompasses both the SIP applications and non-SIP applications, as well as over the top applications. In most cases, procedures, which generate UDRs 66 from policy server 40 are sufficient to enable new applications, without requiring the applications to generate accounting data. Accounting model allows new SIP application services and non-SIP application services to be added to system 10 with ease. Accounting model 110 allows for fewer interfaces and back end processes.

Usage Data Records (UDRs) 66 are account data of the usage of the underlying IP network and its resources. UDRs, like accounting records, are typically generated at the end of an IP session, but can be generated upon other events as well, such as exceeding a threshold of usage. UDRs 66 also include information on the application that caused the utilization of the IP network. As a result, UDRs 66 alone are often sufficient as the primary record of network usage, such that accounting records 68 from application manager and application server are sometimes optional.

IPGW 24 can generate accounting data from RAN events. In one particular embodiment of FIG. 2, there can be multiple IPGWs 24 because users of ATs may move outside coverage area so system 10 supports handoffs between IPGWs 24. A particular IPGW 24 only serves a certain coverage area. When user of AT 20 moves from one part of network to another part of network, the user session can continue to be active. AT gets handed off to another IPGW 24 when AT moves out of original IPGW's 24 coverage area.

Bearer manager 30 can act as consolidator to accounting information 66 generated by lower layer elements, such as IPGWs 24. Bearer manager 30 is already the mobility anchor to send traffic to for a particular user and bearer manager determines the appropriate IPGW 24 to send traffic to. Bearer manager 30 also receives accounting data 66. Bearer manager 30 can consolidate all updated accounting information 66 coming from IPGW 24 when a mobility event occurs, such as user moving from one IPGW 24 to another IPGW 24. It is more efficient for bearer manager 30 to consolidate the accounting information 66 generated by IPGWs 24 because bearer manager 30 already handles mobility events. System 10 is less efficient if SDM 92 has to deal with these mobility events because SDM 92 prefers to only see a single charging session, such as time session started, amount of data used, and time session ended. Bearer manager 30 is performing consolidation function so SDM 92 does not have to. Bearer manager 30 can help policy server 40 detect if the flow disappears or if user moves out of service, etc. Therefore, there are ways for policy server 40 to be informed if the session stops without the application telling the policy server 40 that the session stops.

Interface 64 can be any appropriate interface to communicate data between components in FIG. 2. One skilled in the art will recognize the need for the different interfaces. In this particular embodiment, interface 64 is a DIAMETER Rf interface. The Rf protocol allows an IMS Charging Trigger Function (CTF) 72 to issue offline charging events to a Charging Data Function (CDF) 75. The charging events can either be one-time events or may be session-based. The START, INTERIM, and STOP event types are used for session-based accounting. The EVENT type is used for event based accounting, or to indicate a failed attempt to establish a session. START event type starts an accounting session. INTERIM event type updates an accounting session. STOP event type stops an accounting session. Offline charging is used for network services that are paid for periodically. For example, a user may have a subscription for voice calls that is paid monthly. In the Rf accounting framework, Charging Data Function (CDF) 75 can be located anywhere, including policy server. In some embodiments, interface 64 may be an Ra interface or a policy interface. In other embodiments, interface can be any appropriate interface to handle events between components, such as accounting events or policy events.

Accounting trigger function (ATF) 72 is an element generating a certain accounting event and sending it to an element where accounting receiving function (ARF) 74 resides. It does not matter to the entity sending accounting information where ARF 74 resides. For example, bearer manager 30 can send accounting information 66 directly to SDM 92 or may send it up to policy server 40 for further consolidation, but this is immaterial to bearer manager 30. In this embodiment, ATF 72 and ARF 75 are broad terms for elements that can be used in various entities. ATF 72 can be an IMS charging trigger function. ARF 74 can be an IMS charging data function 75. ARF 74 can also be an IMS charging gateway function 77. ARF 74 can also be a combination of CDF 75 and CGF 77. In other embodiments, ARF, ATF, CTF, CDF, and CGF can be located in any of the components in FIG. 2.

In this embodiment, instead of having ATF 72 in IPGW 24 (or its equivalent element) send charging events directly to CDF 75 or SDM 92, ATF 72 sends accounting data 66 to CTCF 76 in bearer manager 30, which looks like a CDF 75 to ATF 72. This is done according to the protocols and procedures specified for the access network in question (for example, DIAMETER-based Rf, RADIUS, proprietary, etc.).

In this embodiment, CTCF 76 is located in bearer manager 30. CTCF 76 receives accounting events from ATF 72 in IPGW 24. CTCF 76 in turn sends the accounting events to CDF 75 in accordance with the Rf-based interface 64 thereby providing unified accounting information to CDF 75. CTCF 76 can send accounting events (after conversion, if necessary) to CDF 75 as they are received. CTCF 76 can also consolidate multiple accounting events before sending accounting data 66 to CDF 75.

Consolidating multiple events is useful when performing handoff between different IPGWs 24, while the session is still in progress. CTCF 76 remembers older accounting data 66 received from past events from IPGW 24 (e.g. packets and bytes sent and received) and consolidates it with accounting data 66 received from new IPGW 24 before CTCF sends accounting data 66 to CDF 75 (for example, when the session ends or as intermediate information). Bearer manager 30 may generate accounting data 66 of its own as well and include that with the information sent to CDF 75. Bearer manager 30 and its CTCF 76 provide a single and unified bearer-level accounting interface to CDF 75. Additionally, bearer manager 30 and CTCF 76 mask any local network mobility that may occur within the scope of that bearer manager 30.

In one embodiment, RAN 22 is an access network below bearer manager 30. In other embodiments, there can be one or more different access networks below the bearer manager also. In the illustrated embodiment, IPGW 24 is connected to RAN 22 and assume its a CDMA based RAN 22 with its own set of protocols that are going to be used. If AT 20 move into GSM based networks for example, visited network may not have IPGW 24. Even if visited network has an element similar to IPGW 24, the protocols used by elements similar to IPGW 24 may be different, such that the accounting information generated by these elements are different than accounting information generated by IPGW 24.

Packet Data Interworking Function (PDIF) 78 is useful if AT 20 roams to a network outside of RAN's coverage. PDIF 78 allows AT 20 to use home network, such as user's DSL cable, and tunnel AT's traffic into IPGW/PDIF 78 function that resides on home network allowing AT 20 to connect into bearer manager 30. Accounting information 66 being generated outside of home network may be different because other access networks may generate different kind of accounting information than a radio access network. It is not efficient for SDM 92 to deal with these variations in different access networks so bearer manager 30 acting as the consolidator not only shows mobility events but can also handle any variations in access network technology.

An advantage of using accounting model 110, bearer manager 30 already has the support for these different types of access networks 22 because that is how traffic gets forwarded to and from those networks and mobility events. Therefore, it is much more efficient for bearer manager 30 to process and consolidate a variety of accounting information 66 originating from one or more types of access networks 22.

Policy server 40 receives various system events and policy data 66 from both application manager 50 for SIP applications and non-SIP applications 70. Policy server 40 also receives various system events and accounting data from bearer manager 30. Policy server 40 records this policy information 67 along with UDRs 66 from bearer manager 30. Thus, policy server 40 can generate a single usage data record at the end of each session, which contains both policy data from applications and accounting data associated with each application. For example, a policy interface and policy interactions provide policy server 40 with policy data. Policy data can include at least the name of the application that was invoked (received from the application), start time, stop time, parameters associated with application (for example, "PCMU", "GZ29", or other encoding methods), and tokens containing information associated with particular application flows (for example, "audio" or "video"). An accounting interface 64 and accounting events provide policy server with UDRs 66 and accounting data (for example, the network resources that were used). This single record 69 generated by policy server can, in many cases, provide sufficient accounting information to avoid the need for any other network elements to perform accounting operations. Policy server 40 can send a consolidated UDR to SDM 92 rather than have various elements all sending accounting data to SDM 92. Accounting data 66 can be in any format and contain any data known by those skilled in the art to accomplish goals of the present invention. Policy data 67 can be in any format and contain any data known by those skilled in the art to accomplish goals of the present invention.

Policy server 40 is informed about the start and stop of each application by the application itself, the type of application that is running by inclusion of a token, the IP session details for that application, the quality of service requested for that session, as well as any other network resource parameters to be used for charging user of AT 20. The application 50, 70 may either inform policy server 40 of user to be charged, or the policy server 40 may determine that from the IP-addressing information being provided (users have a policy profile associated with them). In communication with bearer manager 30, policy server 40 can instruct bearer manager 30 to provide network resource accounting information 66 to it, and hence policy server 40 can learn, at the end of each session, any accounting information from bearer plane, including actual bandwidth utilization, packet loss percentages, QOS, and so on. In case of abnormal bearer level session termination, bearer manager 30 can inform policy server 40, such that policy server 30 stop generating an accounting record (and inform the application). Policy server 40 may also periodically verify with bearer manager 30 that the bearer level session is still active.

Policy server 40 can install quality of service and accounting facets at a per session/per application flow that controls the usage of resources at bearer manager 30. The accounting facets dictate the modality of bearer accounting, (e.g.: time, volume) for the specific application flows defined by the classifiers. Events corresponding to dynamic facets installed by policy server 40 report the packet counters on the trigger conditions—threshold and/or time. The packet counters are then reset after the reporting event for the next trigger condition. Policy server 40 can further generate accounting data records 69 that consolidate events received at a per-session basis from bearer manager 30 as well as the events reported by application manager 50.

This information is useful in both consolidation and correlation of accounting related to dynamic quality of service, as well as applications. For example, a provider can still charge a user based on the specific application usage even if charging is not enabled at the application layer. Policy server 40 is the central component in system 10 that most components communicate with regardless if components are SIP applications or non-SIP applications. Policy server 40 also communicates with the network elements, such as bearer manager 30.

Policy server 40 is in a central position and able to generate accounting data 66 effectively for anything that goes on. For example, when a SIP application is invoked, communication goes through application manager 50 and application manager 50 can communicate with policy manager 40 and ask for policy decision asking if application manager 50 is allowed to go ahead with this application 60. In this request that application manager 50 sends down to policy server 40, it can include information that tells policy server 40 the type of application it is invoking and various parameters associated with it, such as info on the media streams that it will be using. Policy server 40 is getting information about the application as well as the user associated with this application. This happens for application manager 50 (SIP based applications) and non-SIP applications 70. Policy server 40 is learning about all these applications being invoked. Policy server is in unique position to generate accounting data associated with particular application information.

Policy server 40 also talks to the network elements, such as bearer manager 30, to authorize the use of network resources as well as specifying what are the charging rules that policy server wants installed in these elements when AT 20 tries to invoke a service. For example, setting up a voice call involves counting the number of packets or bytes being exchanged that are associated with this particular voice call. Bearer manager 30 sends this info (the network resource level accounting info) to policy server 40 and policy server 40 consolidate all this information. Policy server 40 knows at least i) what was the application that was invoked, ii) user that invoked it, iii) various parameters associated with that application, and iv) the bearer level resources that are actually used for this particular application.

Policy server 40 is the single entity in the entire system that can generate accounting data for the overall session. This is efficient because it applies to SIP, but also applies to non SIP applications like media streaming service or gaming service, etc., and this particular service does not have to generate accounting data, or be implemented on this element, or be integrated on the billing back-end. Now, policy server 40 records facts that this new application was invoked and this was the subscriber and these were the bearer level resources used. Policy server 40 then sends accounting data to SDM 92. Policy server knows when the session starts and when the sessions stops. Bearer manager 30 can help policy server 30 detect if the flow disappears or if AT 20 moves out of service, etc. Therefore, there are ways for policy server 40 to also be informed if the session stops without the application telling policy server 40 that the session stops.

In some scenarios, additional information regarding the application needs to be captured that is not recorded or collected by policy server 40 or bearer manager 30. To handle scenarios, which require application based accounting, the specific application manager 50 can record events, which may be used for accounting. For non-SIP applications, specific application servers 70 can capture this data or a function using application detection using deep packet inspection can capture this data.

Charging correlation is required for correlation between usage at the application layer 55 (for example, application manager and application servers) and the bearer layer 25 (for example, bearer manager and IPGW) for specific application sessions.

A bearer correlation identifier is allocated per IP user session by bearer manager in the home network, and sent to the visited network via policy peering. The bearer correlation identifier is used by both the visited bearer manager and home bearer manager in UDRs generated corresponding to the Mobile IP session.

Applications may still want to generate more detailed application layer accounting information. To enable correlation with those resources, policy server 40 generates a correlation identifier 85, which is provided to the application as part of the initial policy interaction.

A dynamic correlation identifier 85 is used per application session (i.e., SIP call or streaming media session) to correlate usage at the application layer with the IP network. For application requests initiated by ATs 20, application manager 50 or non-SIP application server 70 contacts policy server 40 for authorization. Policy server 40 generates correlation identifier 85, and passes it to application manager 50 or non-SIP application server 70. Same correlation identifier 85 is passed to bearer manager 30 and IPGW 24 as part of the accounting facets. However, in the case of SIP calls initiated by PSTN gateways 82, correlation identifier 85 may be allocated by the originating gateway, carried in the SIP signaling message, and then passed from application manager 50 to policy server 40. Accounting data 66 generated by PSTN gateway 82, application manager 50, or application server 70, and UDRs 66 generated by policy server 40, include this correlation identifier 85.

Figure 3:
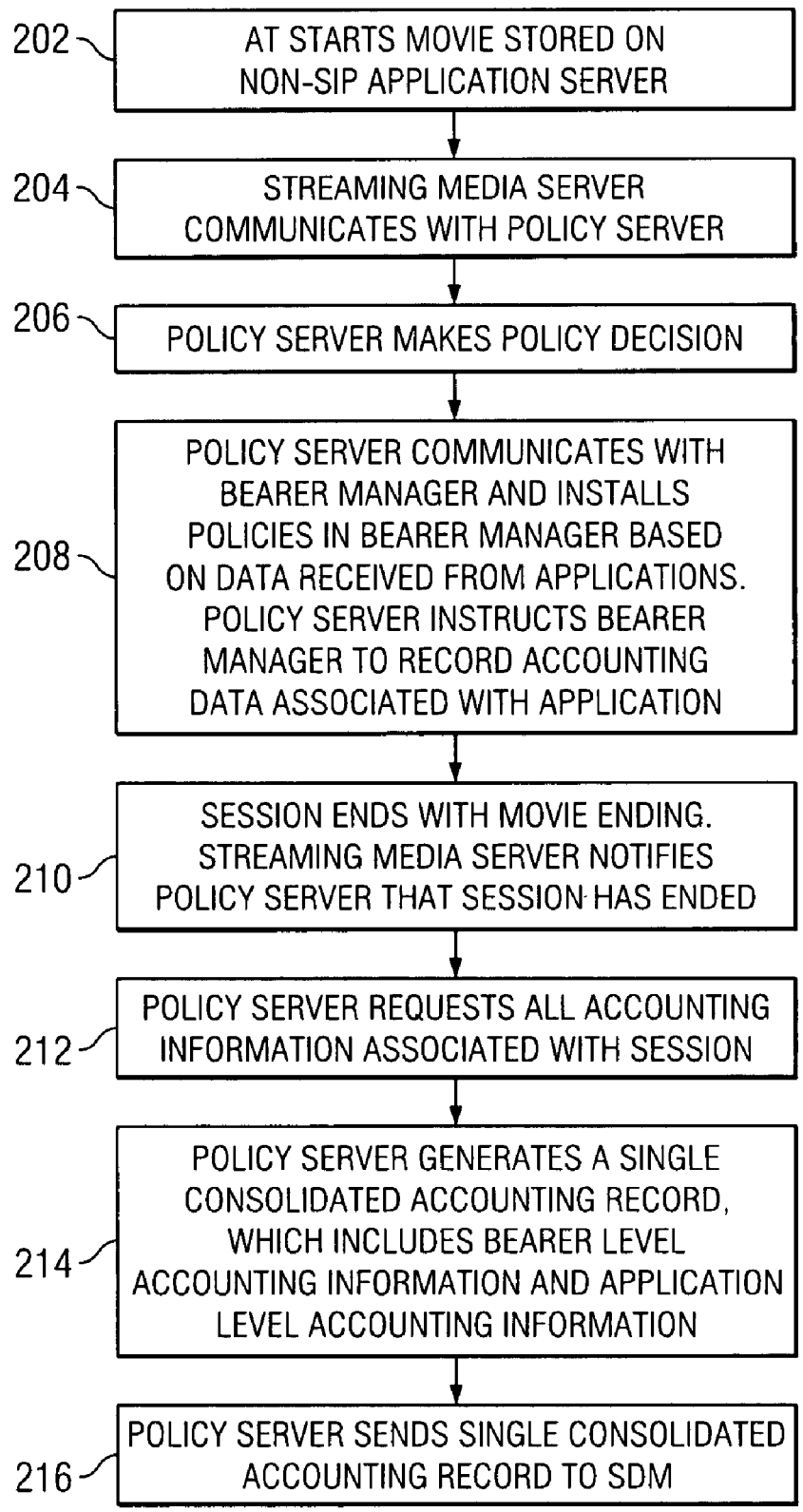
FIG. 3 is a simplified flowchart that illustrates an example method of consolidating accounting data in accordance with an embodiment of the present invention.

FIG. 3 is a simplified flowchart that illustrates an example method of consolidating accounting data 76 in accordance with an embodiment of the present invention. The example process begins at step 202 when AT 20 starts a movie stored on non-SIP application server 70. AT 20 sends signaling message that ends up at application on a streaming media server 70. At step 204, streaming media server 70 communicates to policy server 40 including information that user 20 wants to invoke a streaming media application along with extra information 67 that is part of the policy process, such as codecs and bandwidth being used, etc. At step 206, policy server 40 makes policy decision to allow application to continue and starts a session.

At step 208, policy server 40 also communicates with bearer manager 30 and installs policies in bearer manager 30 based on the information 66 that it received from application server 70, such as network resources needed by AT 20 trying to setup a flow and the source IP address and destination IP address associated with the session. Policy server 40 tells bearer manager 30 to enable quality of service. In addition, policy server 40 tells bearer manager 30 to record accounting operations, such as number of bytes and packets being sent, and tells bearer manager 30 to send accounting data 66 to policy server 40 when session is over. At step 210, movie ends and session is over (for example, user could stop movie or application can stop on its own). Streaming media server 70 sends message to policy server 40 notifying policy server 40 that the session has ended and not to authorize any more resources to AT 20. At step 212, policy server 40 knows application is finished. Policy server 40 sends message to bearer manager 30 to get rid of this particular policy and as a result to request all accounting information 66 associated with this session that was recorded by bearer manager 30.

At step 214, policy server 40 now has all the information it needs. Policy server 40 can generate a single consolidated accounting record now, which includes accounting information 66 from the bearer level 25 and the application level 55. Accounting record may include at least the following information: user information, streaming media service invoked, the codec used, total time of session, number of total packets were generated, and number of total bytes transmitted. At step 216, policy server 40 sends single accounting record to SDM 92 with this information.

It is important to note that the stages and steps described above illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing compatibility functions.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, RAN 22 illustrated by FIG. 1 may be supplanted by Wi-Fi or any other suitable access networks that are conducive to network communications. In addition, while the foregoing discussion has focused on SIP, any other suitable session protocol may benefit from the compatibility teachings provided herein. The present invention is not confined to the SIP platform or to the identified signaling protocols.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for creating an accounting record in a communication network, comprising:

receiving, by a policy server, policy data from one or more application layer elements, the policy data comprising information associated with an IP session associated with an invoked application, the policy data further comprising a name of the invoked application;

receiving, by the policy server, accounting data associated with the IP session from a bearer manager, the accounting data comprising information associated with resources used by one or more lower layer elements during the IP session, the policy server operable to send one or more policies to the bearer manager, the one or more policies operable to instruct the bearer manager to take one or more actions if one or more conditions are satisfied; and creating a consolidated billing record, by the policy server, the consolidated billing record comprising the accounting data received and the policy data received.

2. The method of claim 1 further comprising processing the accounting data and the policy data into a unified format, the unified format being compatible with a services data manager.

3. The method of claim 1 further comprising sending the consolidated accounting data and policy data to a services data manager.

4. The method of claim 1, the lower layer elements being a selected element of a group of lower layer elements, the group consisting of:
   a) an IP gateway; and
   b) a radio access network.

5. The method of claim 1, the application layer elements being a selected element of a group of application layer elements, the group consisting of:
   a) an application manager;
   b) a SIP application; and
   c) a non-SIP application.

6. The method of claim 1, the accounting data being a selected data of a group of accounting data, the group consisting of:
   a) duration;
   b) total bytes used; and
   c) total packets used.

7. The method of claim 1, the policy data being a selected data of a group of policy data, the group consisting of:
   a) start time;
   b) stop time;
   c) application name;
   d) user name;
   e) parameters associated with application;
   f) encoding methods associated with application; and
   g) token providing additional details associated with application.

8. A system for creating a data record in a communication network, comprising:
   a bearer manager;
   one or more lower layer elements;
   one or more application layer elements; and
   a policy server operable to:
      receive policy data from one or more application layer elements, the policy data comprising information associated with an IP session associated with an invoked application, the policy data further comprising a name of the invoked application;
      receive accounting data associated with the IP session from the bearer manager, the accounting data comprising information associated with resources used by one or more lower layer elements during the IP session, the policy server operable to send one or more policies to the bearer manager, the one or more policies operable to instruct the bearer manager to take one or more actions if one or more conditions are satisfied; and
      create a consolidated billing record, the consolidated billing record comprising the accounting data received and the policy data received.

9. The system of claim 8, wherein the policy server is further operable to process the accounting data and the policy data into a unified format, the unified format being compatible with a services data manager.

10. The system of claim 8, wherein the policy server is further operable to send the consolidated accounting data and policy data to a services data manager.

11. The system of claim 8, the lower layer elements being a selected element of a group of lower layer elements, the group consisting of:
   a) an IP gateway; and
   b) a radio access network.

12. The system of claim 8, the application layer elements being a selected element of a group of application layer elements, the group consisting of:
   a) an application manager;
   b) a SIP application; and
   c) a non-SIP application.

13. The system of claim 8, the accounting data being a selected data of a group of accounting data, the group consisting of:
   a) duration;
   b) total bytes used; and
   c) total packets used.

14. The system of claim 8, the policy data being a selected data of a group of policy data, the group consisting of:
   a) start time;
   b) stop time;
   c) application name;
   d) user name;
   e) parameters associated with application;
   f) encoding methods associated with application; and
   g) token providing additional details associated with application.

15. A computer readable medium comprising software for communicating data, the software comprising code such that when executed is operable to:
   receive policy data from one or more application layer elements, the policy data comprising information associated with an IP session associated with an invoked application, the policy data further comprising a name of the invoked application;
   receive accounting data associated with the IP session from a bearer manager, the accounting data comprising information associated with resources used by one or more lower layer elements during the IP session, the policy server operable to send one or more policies to the bearer manager, the one or more policies operable to instruct the bearer manager to take one or more actions if one or more conditions are satisfied; and
   create a consolidated billing record, the consolidated billing record comprising the accounting data received and the policy data received.

16. The medium of claim 15, wherein the medium is further operable to process the accounting data and the policy data into a unified format, the unified format being compatible with a services data manager.

17. The medium of claim 15, wherein the medium is further operable to send the consolidated accounting data and policy data to a services data manager.

18. The medium of claim 15, the lower layer elements being a selected element of a group of lower layer elements, the group consisting of:
   a) an IP gateway; and
   b) a radio access network.

19. The medium of claim 15, the application layer elements being a selected element of a group of application layer elements, the group consisting of:
   a) an application manager;
   b) a SIP application; and
   c) a non-SIP application.

20. The medium of claim 15, the accounting data being a selected data of a group of accounting data, the group consisting of:

a) duration;
b) total bytes used; and
c) total packets used.

21. The medium of claim 15, the policy data being a selected data of a group of policy data, the group consisting of:
a) start time;
b) stop time;
c) application name;
d) user name;
e) parameters associated with application;
f) encoding methods associated with application; and
g) token providing additional details associated with application.

22. The medium of claim 15, wherein the consolidated accounting data is compatible with an Rf interface.

23. A system for creating a data record in a communication network, comprising:

means for receiving policy data, by a policy server, from one or more application layer elements, the policy data comprising information associated with an IP session associated with an invoked application, the policy data further comprising a name of the invoked application;

means for receiving accounting data, by a policy server, associated with the IP session from a bearer manager, the accounting data comprising information associated with resources used by one or more lower layer elements during the IP session, the policy server operable to send one or more policies to the bearer manager, the one or more policies operable to instruct the bearer manager to take one or more actions if one or more conditions are satisfied; and means for creating a consolidated billing record, by the policy server, the consolidated billing record comprising the accounting data received and the policy data received.

* * * * *